US008692839B2

(12) United States Patent
Wiley et al.

(10) Patent No.: US 8,692,839 B2
(45) **Date of Patent: *Apr. 8, 2014**

(54) METHODS AND SYSTEMS FOR UPDATING A BUFFER

(75) Inventors: George Alan Wiley, San Diego, CA (US); Brian Steele, Denver, CO (US)

(73) Assignee: QUALCOMM Incorporated, San Diego, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 12/020,415

(22) Filed: Jan. 25, 2008

(65) Prior Publication Data

US 2008/0129749 A1 Jun. 5, 2008

Related U.S. Application Data

(62) Division of application No. 11/285,399, filed on Nov. 23, 2005.

(51) Int. Cl.
*G06T 15/00* (2011.01)

(52) U.S. Cl.
USPC ........... 345/539; 345/501; 345/530; 370/216; 370/242; 370/397; 455/450; 455/572

(58) Field of Classification Search
USPC ............... 345/1.1, 1.2, 1.3, 2.1, 2.2, 2.3, 530, 345/556, 559, 560, 501; 370/216, 242, 389, 370/397, 399, 409; 707/3, 101; 455/450, 455/572
See application file for complete search history.

(56) References Cited

U.S. PATENT DOCUMENTS

| | | | |
|---|---|---|---|
| 3,594,304 | A | 7/1971 | Seitzer et al. |
| 4,042,783 | A | 8/1977 | Gindi |
| 4,363,123 | A | 12/1982 | Grover |
| 4,393,444 | A | 7/1983 | Weinberg |
| 4,491,943 | A | 1/1985 | Iga et al. |
| 4,660,096 | A | 4/1987 | Arlan et al. |
| 4,764,805 | A | 8/1988 | Rabbani et al. |

(Continued)

FOREIGN PATENT DOCUMENTS

| | | | |
|---|---|---|---|
| CN | 88101302 | A | 10/1988 |
| CN | 1234709 | A | 11/1999 |

(Continued)

OTHER PUBLICATIONS

"V4400," Product Brochure, May 31, 2004.

(Continued)

*Primary Examiner* — Phu K Nguyen
(74) *Attorney, Agent, or Firm* — Nicholas J. Pauley; Peter Michael Kamarchik; Joseph Agusta

(57) ABSTRACT

The present invention relates to methods and systems for updating a buffer. In one aspect, the present invention provides a method for updating a buffer, which includes strategically writing to the buffer to enable concurrent read and write to the buffer. The method eliminates the need for double buffering, thereby resulting in implementation cost and space savings compared to conventional buffering approaches. The method also prevents image tearing when, used to update a frame buffer associated with a display, but is not limited to such applications. In another aspect, the present invention provides efficient mechanisms to enable buffer update across a communication link. In one example, the present invention provides a method for relaying timing information across a communication link.

16 Claims, 8 Drawing Sheets

(56) References Cited

U.S. PATENT DOCUMENTS

| | | | |
|---|---|---|---|
| 4,769,761 | A | 9/1988 | Downes et al. |
| 4,812,296 | A | 3/1989 | Schmelz et al. |
| 4,821,296 | A | 4/1989 | Cordell |
| 4,891,805 | A | 1/1990 | Fallin |
| 5,079,693 | A | 1/1992 | Miller |
| 5,111,455 | A | 5/1992 | Negus |
| 5,131,012 | A | 7/1992 | Dravida |
| 5,138,616 | A | 8/1992 | Wagner, Jr. et al. |
| 5,155,590 | A | 10/1992 | Beyers, II et al. |
| 5,167,035 | A | 11/1992 | Mann et al. |
| 5,224,213 | A | 6/1993 | Dieffenderfer et al. |
| 5,227,783 | A | 7/1993 | Shaw et al. |
| 5,231,636 | A | 7/1993 | Rasmussen |
| 5,331,642 | A | 7/1994 | Valley et al. |
| 5,345,542 | A | 9/1994 | Wye |
| 5,359,595 | A | 10/1994 | Weddle et al. |
| 5,377,188 | A | 12/1994 | Seki |
| 5,396,636 | A | 3/1995 | Gallagher et al. |
| 5,418,452 | A | 5/1995 | Pyle |
| 5,418,952 | A | 5/1995 | Morley et al. |
| 5,420,858 | A | 5/1995 | Marshall et al. |
| 5,422,894 | A | 6/1995 | Abe et al. |
| 5,430,486 | A | 7/1995 | Fraser et al. |
| 5,477,534 | A | 12/1995 | Kusano |
| 5,483,185 | A | 1/1996 | Scriber et al. |
| 5,490,247 | A | 2/1996 | Tung et al. |
| 5,502,499 | A | 3/1996 | Birch et al. |
| 5,510,832 | A | 4/1996 | Garcia |
| 5,513,185 | A | 4/1996 | Schmidt |
| 5,519,830 | A | 5/1996 | Opoczynski |
| 5,521,907 | A | 5/1996 | Ennis, Jr. et al. |
| 5,524,007 | A | 6/1996 | White et al. |
| 5,530,704 | A | 6/1996 | Gibbons et al. |
| 5,535,336 | A | 7/1996 | Smith et al. |
| 5,543,939 | A | 8/1996 | Harvey et al. |
| 5,546,121 | A | 8/1996 | Gotanda et al. |
| 5,550,489 | A | 8/1996 | Raab |
| 5,559,459 | A | 9/1996 | Back et al. |
| 5,559,952 | A | 9/1996 | Fujimoto |
| 5,560,022 | A | 9/1996 | Dunstan et al. |
| 5,565,957 | A | 10/1996 | Goto |
| 5,575,951 | A | 11/1996 | Anderson |
| 5,604,450 | A | 2/1997 | Borkar et al. |
| 5,619,650 | A | 4/1997 | Bach et al. |
| 5,621,664 | A | 4/1997 | Phaal |
| 5,646,947 | A | 7/1997 | Cooper et al. |
| 5,664,948 | A | 9/1997 | Dimitriadis et al. |
| 5,680,404 | A | 10/1997 | Gray |
| 5,726,990 | A | 3/1998 | Shimada et al. |
| 5,732,352 | A | 3/1998 | Gutowski et al. |
| 5,733,131 | A | 3/1998 | Park |
| 5,734,118 | A | 3/1998 | Ashour et al. |
| 5,751,445 | A | 5/1998 | Masunaga |
| 5,751,951 | A | 5/1998 | Osborne et al. |
| 5,777,999 | A | 7/1998 | Hiraki et al. |
| 5,790,551 | A | 8/1998 | Chan |
| 5,798,720 | A | 8/1998 | Yano et al. |
| 5,802,351 | A | 9/1998 | Frampton |
| 5,815,507 | A | 9/1998 | Vinggaard et al. |
| 5,816,921 | A | 10/1998 | Hosokawa |
| 5,818,255 | A | 10/1998 | New et al. |
| 5,822,603 | A | 10/1998 | Hansen et al. |
| 5,844,918 | A | 12/1998 | Kato |
| 5,847,752 | A | 12/1998 | Sebestyen, I |
| 5,862,160 | A | 1/1999 | Irvin et al. |
| 5,867,501 | A | 2/1999 | Horst et al. |
| 5,867,510 | A | 2/1999 | Steele |
| 5,881,262 | A | 3/1999 | Abramson et al. |
| 5,903,281 | A | 5/1999 | Chen et al. |
| 5,935,256 | A | 8/1999 | Lesmeister |
| 5,953,378 | A | 9/1999 | Hotani et al. |
| 5,958,006 | A | 9/1999 | Eggleston et al. |
| 5,963,557 | A | 10/1999 | Eng |
| 5,963,564 | A | 10/1999 | Petersen et al. |
| 5,963,979 | A | 10/1999 | Inoue et al. |
| 5,969,750 | A | 10/1999 | Hsieh et al. |
| 5,982,362 | A | 11/1999 | Crater et al. |
| 5,983,261 | A | 11/1999 | Riddle |
| 5,990,852 | A | 11/1999 | Szamrej |
| 5,990,902 | A | 11/1999 | Park |
| 5,995,512 | A | 11/1999 | Pogue, Jr. |
| 6,002,709 | A | 12/1999 | Hendrickson |
| 6,014,705 | A | 1/2000 | Koenck et al. |
| 6,047,380 | A | 4/2000 | Nolan et al. |
| 6,049,837 | A | 4/2000 | Youngman |
| 6,055,247 | A | 4/2000 | Kubota et al. |
| 6,064,649 | A | 5/2000 | Johnston |
| 6,078,361 | A | 6/2000 | Reddy |
| 6,081,513 | A | 6/2000 | Roy |
| 6,091,709 | A | 7/2000 | Harrison et al. |
| 6,092,231 | A | 7/2000 | Sze |
| 6,097,401 | A | 8/2000 | Owen et al. |
| 6,101,601 | A | 8/2000 | Matthews et al. |
| 6,118,791 | A | 9/2000 | Fichou et al. |
| 6,151,067 | A | 11/2000 | Suemoto et al. |
| 6,151,320 | A | 11/2000 | Shim et al. |
| 6,154,156 | A | 11/2000 | Tagato |
| 6,154,466 | A | 11/2000 | Iwasaki et al. |
| 6,185,601 | B1 | 2/2001 | Wolff |
| 6,192,230 | B1 | 2/2001 | Van Bokhorst et al. |
| 6,198,752 | B1 | 3/2001 | Lee |
| 6,199,169 | B1 | 3/2001 | Voth et al. |
| 6,222,677 | B1 | 4/2001 | Budd et al. |
| 6,236,647 | B1 | 5/2001 | Amalfitano |
| 6,242,953 | B1 | 6/2001 | Thomas |
| 6,243,596 | B1 | 6/2001 | Kikinis |
| 6,243,761 | B1 | 6/2001 | Mogul et al. |
| 6,246,876 | B1 | 6/2001 | Hontzeas |
| 6,252,526 | B1 | 6/2001 | Uyehara |
| 6,252,888 | B1 | 6/2001 | Fite, Jr. et al. |
| 6,256,509 | B1 | 7/2001 | Tanaka et al. |
| 6,288,739 | B1 | 9/2001 | Hales et al. |
| 6,297,684 | B1 | 10/2001 | Uyehara et al. |
| 6,308,239 | B1 | 10/2001 | Osakada et al. |
| 6,335,696 | B1 | 1/2002 | Aoyagi et al. |
| 6,359,479 | B1 | 3/2002 | Oprescu |
| 6,363,439 | B1 | 3/2002 | Battles et al. |
| 6,393,008 | B1 | 5/2002 | Cheng et al. |
| 6,397,286 | B1 | 5/2002 | Chatenever et al. |
| 6,400,392 | B1 | 6/2002 | Yamaguchi et al. |
| 6,400,654 | B1 | 6/2002 | Sawamura et al. |
| 6,400,754 | B2 | 6/2002 | Fleming et al. |
| 6,421,735 | B1 | 7/2002 | Jung et al. |
| 6,429,867 | B1 | 8/2002 | Deering |
| 6,430,196 | B1 | 8/2002 | Baroudi |
| 6,430,606 | B1 | 8/2002 | Haq |
| 6,434,187 | B1 | 8/2002 | Beard et al. |
| 6,438,363 | B1 | 8/2002 | Feder et al. |
| 6,457,090 | B1 | 9/2002 | Young |
| 6,475,245 | B2 | 11/2002 | Gersho et al. |
| 6,477,186 | B1 | 11/2002 | Nakura et al. |
| 6,480,521 | B1 | 11/2002 | Odenwalder et al. |
| 6,483,825 | B2 | 11/2002 | Seta |
| 6,487,217 | B1 | 11/2002 | Baroudi |
| 6,493,357 | B1 | 12/2002 | Fujisaki |
| 6,493,713 | B1 | 12/2002 | Kanno |
| 6,493,824 | B1 | 12/2002 | Novoa et al. |
| 6,545,979 | B1 | 4/2003 | Poulin |
| 6,549,538 | B1 | 4/2003 | Beck et al. |
| 6,549,958 | B1 | 4/2003 | Kuba |
| 6,574,211 | B2 | 6/2003 | Padovani et al. |
| 6,583,809 | B1 | 6/2003 | Fujiwara |
| 6,594,304 | B2 | 7/2003 | Chan |
| 6,609,167 | B1 | 8/2003 | Bastiani et al. |
| 6,611,221 | B1 | 8/2003 | Soundarapandian et al. |
| 6,611,503 | B1 | 8/2003 | Fitzgerald et al. |
| 6,618,360 | B1 | 9/2003 | Scoville et al. |
| 6,621,809 | B1 | 9/2003 | Lee et al. |
| 6,621,851 | B1 | 9/2003 | Agee et al. |
| 6,636,508 | B1 | 10/2003 | Li et al. |
| 6,636,922 | B1 | 10/2003 | Bastiani et al. |
| 6,662,322 | B1 | 12/2003 | Abdelilah et al. |
| 6,690,201 | B1 | 2/2004 | Simkins et al. |
| 6,714,233 | B2 | 3/2004 | Chihara et al. |

(56) References Cited

U.S. PATENT DOCUMENTS

| | | | | |
|---|---|---|---|---|
| 6,715,088 | B1 | 3/2004 | Togawa | |
| 6,728,263 | B2 | 4/2004 | Joy et al. | |
| 6,738,344 | B1 | 5/2004 | Bunton et al. | |
| 6,745,364 | B2 | 6/2004 | Bhatt et al. | |
| 6,754,179 | B1 | 6/2004 | Lin | |
| 6,760,722 | B1 | 7/2004 | Raghunandan | |
| 6,760,772 | B2 | 7/2004 | Zou et al. | |
| 6,760,882 | B1 | 7/2004 | Gesbert et al. | |
| 6,765,506 | B1 | 7/2004 | Lu | |
| 6,771,613 | B1 | 8/2004 | O'Toole et al. | |
| 6,778,493 | B1 | 8/2004 | Ishii | |
| 6,782,039 | B2 | 8/2004 | Alamouti et al. | |
| 6,784,941 | B1 | 8/2004 | Su et al. | |
| 6,791,379 | B1 | 9/2004 | Wakayama et al. | |
| 6,797,891 | B1 | 9/2004 | Blair et al. | |
| 6,804,257 | B1 | 10/2004 | Benayoun et al. | |
| 6,810,084 | B1 | 10/2004 | Jun et al. | |
| 6,813,638 | B1 | 11/2004 | Sevanto et al. | |
| 6,816,929 | B2 | 11/2004 | Ueda | |
| 6,831,685 | B1 | 12/2004 | Ueno et al. | |
| 6,836,469 | B1 | 12/2004 | Wu | |
| 6,850,282 | B1 | 2/2005 | Makino et al. | |
| 6,865,240 | B1 | 3/2005 | Kawataka | |
| 6,865,609 | B1 | 3/2005 | Gubbi et al. | |
| 6,865,610 | B2 | 3/2005 | Bolosky et al. | |
| 6,867,668 | B1 | 3/2005 | Dagostino et al. | |
| 6,882,361 | B1 | 4/2005 | Gaylord | |
| 6,886,035 | B2 | 4/2005 | Wolff | |
| 6,892,071 | B2 | 5/2005 | Park et al. | |
| 6,894,994 | B1 | 5/2005 | Grob et al. | |
| 6,895,410 | B2 | 5/2005 | Ridge | |
| 6,897,891 | B2 | 5/2005 | Itsukaichi | |
| 6,906,762 | B1 | 6/2005 | Witehira | |
| 6,927,746 | B2 | 8/2005 | Lee et al. | |
| 6,944,136 | B2 | 9/2005 | Kim et al. | |
| 6,947,436 | B2 | 9/2005 | Harris et al. | |
| 6,950,428 | B1 | 9/2005 | Horst et al. | |
| 6,956,829 | B2 | 10/2005 | Lee | |
| 6,973,039 | B2 | 12/2005 | Redi et al. | |
| 6,973,062 | B1 | 12/2005 | Han | |
| 6,975,145 | B1 | 12/2005 | Vadi et al. | |
| 6,990,549 | B2 | 1/2006 | Main et al. | |
| 6,993,393 | B2 * | 1/2006 | Von Arx et al. | 607/60 |
| 6,999,432 | B2 | 2/2006 | Zhang et al. | |
| 7,003,796 | B1 | 2/2006 | Humpleman | |
| 7,010,607 | B1 | 3/2006 | Bunton | |
| 7,012,636 | B2 | 3/2006 | Hatanaka | |
| 7,015,838 | B1 | 3/2006 | Groen et al. | |
| 7,023,924 | B1 | 4/2006 | Keller et al. | |
| 7,030,796 | B2 | 4/2006 | Shim et al. | |
| 7,036,066 | B2 | 4/2006 | Weibel et al. | |
| 7,042,914 | B2 | 5/2006 | Zerbe et al. | |
| 7,047,475 | B2 | 5/2006 | Sharma et al. | |
| 7,051,218 | B1 | 5/2006 | Gulick et al. | |
| 7,062,264 | B2 | 6/2006 | Ko et al. | |
| 7,062,579 | B2 | 6/2006 | Tateyama et al. | |
| 7,068,666 | B2 | 6/2006 | Foster et al. | |
| 7,095,435 | B1 | 8/2006 | Hartman et al. | |
| 7,110,420 | B2 | 9/2006 | Bashirullah et al. | |
| 7,126,945 | B2 | 10/2006 | Beach | |
| 7,138,989 | B2 | 11/2006 | Mendelson et al. | |
| 7,143,177 | B1 | 11/2006 | Johnson et al. | |
| 7,143,207 | B2 | 11/2006 | Vogt et al. | |
| 7,145,411 | B1 | 12/2006 | Blair et al. | |
| 7,151,940 | B2 | 12/2006 | Diao | |
| 7,158,536 | B2 | 1/2007 | Ching et al. | |
| 7,158,539 | B2 | 1/2007 | Zhang et al. | |
| 7,161,846 | B2 | 1/2007 | Padaparambil | |
| 7,165,112 | B2 | 1/2007 | Battin et al. | |
| 7,178,042 | B2 | 2/2007 | Sakagami | |
| 7,180,951 | B2 | 2/2007 | Chan | |
| 7,184,408 | B2 | 2/2007 | Denton et al. | |
| 7,187,738 | B2 | 3/2007 | Naven et al. | |
| 7,191,281 | B2 | 3/2007 | Bajikar | |
| 7,219,294 | B2 | 5/2007 | Vogt et al. | |
| 7,231,402 | B2 | 6/2007 | Dickens | |
| 7,251,231 | B2 | 7/2007 | Gubbi | |
| 7,257,087 | B2 | 8/2007 | Grovenburg | |
| 7,260,087 | B2 | 8/2007 | Bao et al. | |
| 7,269,153 | B1 | 9/2007 | Schultz et al. | |
| 7,274,652 | B1 | 9/2007 | Webster et al. | |
| 7,278,069 | B2 | 10/2007 | Abrosimov et al. | |
| 7,284,181 | B1 | 10/2007 | Venkatramani | |
| 7,301,968 | B2 | 11/2007 | Haran et al. | |
| 7,310,535 | B1 | 12/2007 | MacKenzie et al. | |
| 7,315,265 | B2 | 1/2008 | Wiley et al. | |
| 7,315,520 | B2 | 1/2008 | Xue et al. | |
| 7,317,754 | B1 | 1/2008 | Remy et al. | |
| 7,327,735 | B2 | 2/2008 | Robotham et al. | |
| 7,336,139 | B2 | 2/2008 | Blair et al. | |
| 7,336,667 | B2 | 2/2008 | Allen et al. | |
| 7,340,548 | B2 | 3/2008 | Love et al. | |
| 7,349,973 | B2 | 3/2008 | Saito et al. | |
| 7,373,155 | B2 | 5/2008 | Duan et al. | |
| 7,383,350 | B1 | 6/2008 | Moore et al. | |
| 7,383,399 | B2 | 6/2008 | Vogt et al. | |
| 7,392,541 | B2 * | 6/2008 | Largman et al. | 726/17 |
| 7,403,487 | B1 | 7/2008 | Foladare et al. | |
| 7,403,511 | B2 | 7/2008 | Liang et al. | |
| 7,405,703 | B2 | 7/2008 | Qi et al. | |
| 7,412,642 | B2 | 8/2008 | Cypher | |
| 7,430,001 | B2 | 9/2008 | Fujii | |
| 7,447,953 | B2 | 11/2008 | Vogt et al. | |
| 7,451,362 | B2 | 11/2008 | Chen et al. | |
| 7,487,917 | B2 * | 2/2009 | Kotlarsky et al. | 235/462.22 |
| 7,508,760 | B2 | 3/2009 | Akiyama et al. | |
| 7,515,705 | B2 | 4/2009 | Segawa et al. | |
| 7,526,323 | B2 | 4/2009 | Kim et al. | |
| 7,536,598 | B2 * | 5/2009 | Largman et al. | 714/36 |
| 7,543,326 | B2 | 6/2009 | Moni | |
| 7,557,633 | B2 | 7/2009 | Yu | |
| 7,574,113 | B2 | 8/2009 | Nagahara et al. | |
| 7,595,834 | B2 | 9/2009 | Kawai et al. | |
| 7,595,835 | B2 | 9/2009 | Kosaka et al. | |
| 7,634,607 | B2 | 12/2009 | Honda | |
| 7,643,823 | B2 | 1/2010 | Shamoon et al. | |
| 7,729,720 | B2 | 6/2010 | Suh et al. | |
| 7,800,600 | B2 | 9/2010 | Komatsu et al. | |
| 7,813,451 | B2 | 10/2010 | Binder et al. | |
| 7,831,127 | B2 | 11/2010 | Wilkinson | |
| 7,835,280 | B2 | 11/2010 | Pang et al. | |
| 7,844,296 | B2 | 11/2010 | Yuki | |
| 7,873,343 | B2 | 1/2011 | Gollnick et al. | |
| 7,876,821 | B2 | 1/2011 | Li et al. | |
| 7,877,439 | B2 | 1/2011 | Gallou et al. | |
| 7,912,503 | B2 | 3/2011 | Chang et al. | |
| 7,945,143 | B2 | 5/2011 | Yahata et al. | |
| 7,949,777 | B2 | 5/2011 | Wallace et al. | |
| 8,031,130 | B2 | 10/2011 | Tamura | |
| 8,077,634 | B2 | 12/2011 | Maggenti et al. | |
| 8,325,239 | B2 | 12/2012 | Kaplan et al. | |
| 2001/0005385 | A1 | 6/2001 | Ichiguchi et al. | |
| 2001/0012293 | A1 | 8/2001 | Petersen et al. | |
| 2001/0032295 | A1 | 10/2001 | Tsai et al. | |
| 2001/0047450 | A1 | 11/2001 | Gillingham et al. | |
| 2001/0047475 | A1 | 11/2001 | Terasaki | |
| 2001/0053174 | A1 | 12/2001 | Fleming et al. | |
| 2002/0011998 | A1 | 1/2002 | Tamura | |
| 2002/0045448 | A1 | 4/2002 | Park et al. | |
| 2002/0067787 | A1 | 6/2002 | Naven et al. | |
| 2002/0071395 | A1 | 6/2002 | Redi et al. | |
| 2002/0131379 | A1 | 9/2002 | Lee et al. | |
| 2002/0140845 | A1 | 10/2002 | Yoshida et al. | |
| 2002/0146024 | A1 | 10/2002 | Harris et al. | |
| 2002/0188907 | A1 | 12/2002 | Kobayashi | |
| 2002/0193133 | A1 | 12/2002 | Shibutani | |
| 2003/0003943 | A1 | 1/2003 | Bajikar et al. | |
| 2003/0028647 | A1 | 2/2003 | Grosu | |
| 2003/0033417 | A1 | 2/2003 | Zou et al. | |
| 2003/0034955 | A1 | 2/2003 | Gilder et al. | |
| 2003/0035049 | A1 | 2/2003 | Dickens et al. | |
| 2003/0039212 | A1 | 2/2003 | Lloyd et al. | |
| 2003/0061431 | A1 | 3/2003 | Mears et al. | |
| 2003/0081557 | A1 | 5/2003 | Mettala et al. | |

(56) References Cited

U.S. PATENT DOCUMENTS

| | | | |
|---|---|---|---|
| 2003/0086443 | A1 | 5/2003 | Beach et al. |
| 2003/0091056 | A1 | 5/2003 | Paul et al. |
| 2003/0093607 | A1 | 5/2003 | Main et al. |
| 2003/0125040 | A1 | 7/2003 | Walton et al. |
| 2003/0144006 | A1 | 7/2003 | Johansson et al. |
| 2003/0158979 | A1 | 8/2003 | Tateyama et al. |
| 2003/0185220 | A1 | 10/2003 | Valenci |
| 2003/0191809 | A1 | 10/2003 | Mosley et al. |
| 2003/0194018 | A1 | 10/2003 | Chang |
| 2003/0235209 | A1 | 12/2003 | Garg et al. |
| 2004/0008631 | A1 | 1/2004 | Kim |
| 2004/0024920 | A1 | 2/2004 | Gulick et al. |
| 2004/0028415 | A1 | 2/2004 | Eiselt |
| 2004/0049616 | A1 | 3/2004 | Dunstan et al. |
| 2004/0073697 | A1 | 4/2004 | Saito et al. |
| 2004/0082383 | A1 | 4/2004 | Muncaster et al. |
| 2004/0100966 | A1 | 5/2004 | Allen, Jr. et al. |
| 2004/0128563 | A1 | 7/2004 | Kaushik et al. |
| 2004/0130466 | A1 | 7/2004 | Lu et al. |
| 2004/0140459 | A1 | 7/2004 | Haigh et al. |
| 2004/0153952 | A1 | 8/2004 | Sharma et al. |
| 2004/0176065 | A1 | 9/2004 | Liu |
| 2004/0184450 | A1 | 9/2004 | Omran |
| 2004/0199652 | A1 | 10/2004 | Zou et al. |
| 2004/0221315 | A1 | 11/2004 | Kobayashi |
| 2004/0260823 | A1 | 12/2004 | Tiwari et al. |
| 2005/0012905 | A1 | 1/2005 | Morinaga |
| 2005/0020279 | A1 | 1/2005 | Markhovsky et al. |
| 2005/0021885 | A1 | 1/2005 | Anderson et al. |
| 2005/0033586 | A1 | 2/2005 | Savell |
| 2005/0055399 | A1 | 3/2005 | Savchuk |
| 2005/0088939 | A1 | 4/2005 | Hwang et al. |
| 2005/0091593 | A1 | 4/2005 | Peltz |
| 2005/0108611 | A1 | 5/2005 | Vogt et al. |
| 2005/0117601 | A1 | 6/2005 | Anderson et al. |
| 2005/0120079 | A1 | 6/2005 | Anderson et al. |
| 2005/0120208 | A1 | 6/2005 | Dobson et al. |
| 2005/0125840 | A1 | 6/2005 | Anderson et al. |
| 2005/0135390 | A1 | 6/2005 | Anderson et al. |
| 2005/0138260 | A1 | 6/2005 | Love et al. |
| 2005/0144225 | A1 | 6/2005 | Anderson et al. |
| 2005/0154599 | A1 | 7/2005 | Kopra et al. |
| 2005/0163085 | A1 | 7/2005 | Cromer et al. |
| 2005/0163116 | A1 | 7/2005 | Anderson et al. |
| 2005/0165970 | A1 | 7/2005 | Ching et al. |
| 2005/0184993 | A1 | 8/2005 | Ludwin et al. |
| 2005/0204057 | A1 | 9/2005 | Anderson et al. |
| 2005/0213593 | A1 | 9/2005 | Anderson et al. |
| 2005/0216421 | A1 | 9/2005 | Barry et al. |
| 2005/0216599 | A1 | 9/2005 | Anderson et al. |
| 2005/0216623 | A1 | 9/2005 | Dietrich et al. |
| 2005/0248685 | A1 | 11/2005 | Seo et al. |
| 2005/0259670 | A1 | 11/2005 | Anderson et al. |
| 2005/0265333 | A1 | 12/2005 | Coffey et al. |
| 2005/0271072 | A1 | 12/2005 | Anderson et al. |
| 2005/0286466 | A1 | 12/2005 | Tagg et al. |
| 2006/0004968 | A1 | 1/2006 | Vogt et al. |
| 2006/0034301 | A1 | 2/2006 | Anderson et al. |
| 2006/0034326 | A1 | 2/2006 | Anderson et al. |
| 2006/0120433 | A1 | 6/2006 | Baker et al. |
| 2006/0128399 | A1 | 6/2006 | Duan et al. |
| 2006/0161691 | A1 | 7/2006 | Katibian et al. |
| 2006/0164424 | A1 | 7/2006 | Wiley et al. |
| 2006/0168496 | A1 | 7/2006 | Steele et al. |
| 2006/0171414 | A1 | 8/2006 | Katibian et al. |
| 2006/0179164 | A1 | 8/2006 | Katibian et al. |
| 2006/0179384 | A1 | 8/2006 | Wiley et al. |
| 2006/0212775 | A1 | 9/2006 | Cypher et al. |
| 2006/0274031 | A1 | 12/2006 | Yuen et al. |
| 2006/0288133 | A1 | 12/2006 | Katibian et al. |
| 2007/0008897 | A1 | 1/2007 | Denton et al. |
| 2007/0073949 | A1 | 3/2007 | Fredrickson et al. |
| 2007/0098002 | A1 | 5/2007 | Liu et al. |
| 2007/0274434 | A1 | 11/2007 | Arkas et al. |
| 2008/0036631 | A1 | 2/2008 | Musfeldt |
| 2008/0088492 | A1 | 4/2008 | Wiley et al. |
| 2008/0147951 | A1 | 6/2008 | Love |
| 2008/0282296 | A1 | 11/2008 | Kawai et al. |
| 2009/0055709 | A1 | 2/2009 | Anderson et al. |
| 2009/0070479 | A1 | 3/2009 | Anderson et al. |
| 2009/0290628 | A1 | 11/2009 | Matsumoto |
| 2010/0128626 | A1 | 5/2010 | Anderson et al. |
| 2010/0260055 | A1 | 10/2010 | Anderson et al. |
| 2011/0013681 | A1 | 1/2011 | Zou et al. |
| 2011/0022719 | A1 | 1/2011 | Anderson et al. |
| 2011/0199383 | A1 | 8/2011 | Anderson et al. |
| 2011/0199931 | A1 | 8/2011 | Anderson et al. |
| 2012/0008642 | A1 | 1/2012 | Katibian et al. |

FOREIGN PATENT DOCUMENTS

| | | | |
|---|---|---|---|
| CN | 1310400 | A | 8/2001 |
| CN | 1377194 | A | 10/2002 |
| CN | 1467953 | A | 1/2004 |
| CN | 1476268 | A | 2/2004 |
| EP | 0594006 | A1 | 4/1994 |
| EP | 0872085 | | 12/1996 |
| EP | 0850522 | A2 | 7/1998 |
| EP | 0896318 | | 2/1999 |
| EP | 0969676 | | 1/2000 |
| EP | 1217602 | A2 | 6/2002 |
| EP | 1309151 | | 5/2003 |
| EP | 1423778 | A2 | 6/2004 |
| EP | 1478137 | A1 | 11/2004 |
| EP | 1544743 | A2 | 6/2005 |
| EP | 1580964 | A1 | 9/2005 |
| EP | 1630784 | | 3/2006 |
| FR | 2729528 | A1 | 7/1996 |
| GB | 2250668 | A | 6/1992 |
| GB | 222657996 | A | 10/1993 |
| JP | 53131709 | A | 11/1978 |
| JP | 62132433 | A | 6/1987 |
| JP | 64008731 | U | 1/1989 |
| JP | H01129371 | A | 5/1989 |
| JP | 1314022 | A | 12/1989 |
| JP | H0465711 | A | 3/1992 |
| JP | 4167715 | A | 6/1992 |
| JP | 4241541 | | 8/1992 |
| JP | 5199387 | A | 8/1993 |
| JP | 5219141 | A | 8/1993 |
| JP | 5260115 | A | 10/1993 |
| JP | 6037848 | A | 2/1994 |
| JP | 06053973 | | 2/1994 |
| JP | 06317829 | | 11/1994 |
| JP | 7115352 | A | 5/1995 |
| JP | 08037490 | | 2/1996 |
| JP | H0854481 | A | 2/1996 |
| JP | 08-274799 | | 10/1996 |
| JP | 09-006725 | | 1/1997 |
| JP | H0923243 | A | 1/1997 |
| JP | 09230837 | A | 9/1997 |
| JP | 09261232 | | 10/1997 |
| JP | 9270951 | A | 10/1997 |
| JP | 9307457 | A | 11/1997 |
| JP | 10200941 | | 7/1998 |
| JP | 10234038 | A | 9/1998 |
| JP | 10312370 | A | 11/1998 |
| JP | 11017710 | | 1/1999 |
| JP | 11032041 | A | 2/1999 |
| JP | 11122234 | A | 4/1999 |
| JP | 11163690 | A | 6/1999 |
| JP | 11225182 | A | 8/1999 |
| JP | 11225372 | A | 8/1999 |
| JP | 11249987 | A | 9/1999 |
| JP | 11282786 | A | 10/1999 |
| JP | 11341363 | A | 12/1999 |
| JP | 11355327 | A | 12/1999 |
| JP | 2000188626 | | 7/2000 |
| JP | 2000216843 | A | 8/2000 |
| JP | 2000236260 | A | 8/2000 |
| JP | 2000278141 | A | 10/2000 |
| JP | 2000295667 | | 10/2000 |
| JP | 2000324135 | A | 11/2000 |
| JP | 2000358033 | A | 12/2000 |

(56) References Cited

FOREIGN PATENT DOCUMENTS

| | | | |
|---|---|---|---|
| JP | 200144960 | | 2/2001 |
| JP | 200194542 | | 4/2001 |
| JP | 2001094524 | | 4/2001 |
| JP | 2001177746 | | 6/2001 |
| JP | 2001222474 | A | 8/2001 |
| JP | 2001282714 | A | 10/2001 |
| JP | 2001292146 | A | 10/2001 |
| JP | 2001306428 | | 11/2001 |
| JP | 2001319745 | A | 11/2001 |
| JP | 2001320280 | A | 11/2001 |
| JP | 2001333130 | A | 11/2001 |
| JP | 2002500855 | A | 1/2002 |
| JP | 2002503065 | T | 1/2002 |
| JP | 2002062990 | A | 2/2002 |
| JP | 2002208844 | A | 7/2002 |
| JP | 2002281007 | A | 9/2002 |
| JP | 2002300229 | A | 10/2002 |
| JP | 2002300299 | A | 10/2002 |
| JP | 2003006143 | A | 1/2003 |
| JP | 2003009035 | A | 1/2003 |
| JP | 2003044184 | A | 2/2003 |
| JP | 2003046595 | | 2/2003 |
| JP | 2003046596 | A | 2/2003 |
| JP | 2003058271 | A | 2/2003 |
| JP | 2003069544 | A | 3/2003 |
| JP | 2003076654 | A | 3/2003 |
| JP | 2003098583 | A | 4/2003 |
| JP | 2003111135 | A | 4/2003 |
| JP | 2003167680 | | 6/2003 |
| JP | 2003198550 | A | 7/2003 |
| JP | 2003303068 | A | 10/2003 |
| JP | 2004005683 | A | 1/2004 |
| JP | 2004007356 | A | 1/2004 |
| JP | 2004021613 | | 1/2004 |
| JP | 2004046324 | A | 2/2004 |
| JP | 2004153620 | | 5/2004 |
| JP | 2004246023 | A | 9/2004 |
| JP | 2004297660 | A | 10/2004 |
| JP | 2004531916 | T | 10/2004 |
| JP | 2004309623 | A | 11/2004 |
| JP | 2004363687 | A | 12/2004 |
| JP | 2005107683 | A | 4/2005 |
| JP | 2005536167 | A | 11/2005 |
| JP | 2005539464 | A | 12/2005 |
| KR | 1020060056989 | | 5/1999 |
| KR | 199961245 | | 9/1999 |
| KR | 0222225 | | 10/1999 |
| KR | 1019990082741 | | 11/1999 |
| KR | 200039224 | | 7/2000 |
| KR | 1999-0058829 | | 1/2001 |
| KR | 20010019734 | A | 3/2001 |
| KR | 20020071226 | | 9/2002 |
| KR | 2003-0061001 | | 7/2003 |
| KR | 2004-0014406 | | 2/2004 |
| KR | 1020047003852 | | 5/2004 |
| KR | 2004-69360 | | 8/2004 |
| KR | 1020060053050 | | 5/2006 |
| RU | 2111619 | | 5/1998 |
| RU | 2150791 | | 6/2000 |
| RU | 2337497 | | 10/2008 |
| RU | 2337497 | C2 | 10/2008 |
| TW | 459184 | B | 10/2001 |
| TW | 466410 | | 12/2001 |
| TW | 488133 | B | 5/2002 |
| TW | 507195 | | 10/2002 |
| TW | 513636 | | 12/2002 |
| TW | 515154 | | 12/2002 |
| TW | 529253 | | 4/2003 |
| TW | 535372 | | 6/2003 |
| TW | 540238 | B | 7/2003 |
| TW | 542979 | B | 7/2003 |
| TW | 200302008 | | 7/2003 |
| TW | 546958 | | 8/2003 |
| TW | 552792 | B | 9/2003 |
| TW | 200304313 | | 9/2003 |
| TW | 563305 | B | 11/2003 |
| TW | 569547 | B | 1/2004 |
| TW | 595116 | B | 6/2004 |
| WO | 9210890 | | 6/1992 |
| WO | 9410779 | | 5/1994 |
| WO | 9619053 | | 6/1996 |
| WO | 96/42158 | A1 | 12/1996 |
| WO | 98-02986 | A2 | 1/1998 |
| WO | 9802988 | | 1/1998 |
| WO | WO9915979 | | 4/1999 |
| WO | 9923783 | A2 | 5/1999 |
| WO | 0130038 | | 4/2001 |
| WO | WO0137484 | A2 | 5/2001 |
| WO | WO0138970 | A2 | 5/2001 |
| WO | WO0138982 | A1 | 5/2001 |
| WO | WO0158162 | | 8/2001 |
| WO | 02/49314 | A2 | 6/2002 |
| WO | 0249314 | A1 | 6/2002 |
| WO | WO02098112 | A2 | 12/2002 |
| WO | 03/023587 | A2 | 3/2003 |
| WO | 03023587 | A2 | 3/2003 |
| WO | 03040893 | | 5/2003 |
| WO | WO03039081 | A1 | 5/2003 |
| WO | 03061240 | | 7/2003 |
| WO | WO2004015680 | | 2/2004 |
| WO | WO2004110021 | A2 | 12/2004 |
| WO | WO2005018191 | A2 | 2/2005 |
| WO | 2005073955 | A1 | 8/2005 |
| WO | 2005088939 | | 9/2005 |
| WO | 2005091593 | | 9/2005 |
| WO | 2005096594 | | 10/2005 |
| WO | 2005122509 | | 12/2005 |
| WO | WO2006008067 | | 1/2006 |
| WO | 2006058045 | | 6/2006 |
| WO | 2006058050 | | 6/2006 |
| WO | 2006058051 | | 6/2006 |
| WO | 2006058052 | | 6/2006 |
| WO | 2006058053 | | 6/2006 |
| WO | 2006058067 | | 6/2006 |
| WO | 2006058173 | | 6/2006 |
| WO | WO2006058045 | A2 | 6/2006 |
| WO | WO2006058051 | | 6/2006 |
| WO | WO07051186 | | 5/2007 |

OTHER PUBLICATIONS

Plug and Display Standard Video Electronics Standards Association—VESA. Ver. 1, Jun. 11, 1997.

Sevanto, J., “Multimedia messaging service for GPRS and UMTS”, IEEE on WCNC, Sep. 1999, pp. 1422-1426, vol. 3.

International Search Report PCT/US05/042643—Internationai Search Authority—US Oct. 5, 2006.

International Search Report PCT/US05/040402—International Search Authority—US Feb. 20, 2007.

International Search Report PCT/US05/040414—International Search Authority—US May 23, 2007.

International Search Report PCT/US05/0402436—International Search Authority—US Oct. 2, 2006.

VESA Mobile Display Digital Interface, Proposed Standard, Version 1P, Draft 10, Aug. 13, 2003, pp. 1-75.

VESA Mobile Display Digital Interface, Proposed Standard, Version 1P, Draft 10, Aug. 13. 2003, pp. 76-151.

VESA Mobile Display Digital Interface, Proposed Standard, Version 1P, Draft 11, Sep. 10. 2003, pp. 1-75.

VESA Mobile Display Digital Interface, Proposed Standard, Version 1P, Draft 11, Sep. 10, 2003, pp. 76-150.

VESA Mobile Display Digital Interface, Proposed Standard, Version 1P, Draft 13, Oct. 15, 2003, pp. 1-75.

VESA Mobile Display Digital Interface, Proposed Standard, Version 1P, Draft 13, Oct. 15, 2003, pp. 76-154.

VESA Mobiie Display Digital Interface, Proposed Standard, Version 1P, Draft 14, Oct. 29, 2003, pp. 1-75.

VESA Mobile Display Digital Interface. Proposed Standard, Version 1P, Draft 14, Oct. 29, 2003, pp. 76-158.

VESA Mobile Display Digital Interface, Proposed Standard, Version 1P, Draft 15, Nov. 12. 2003, pp. 1-75.

(56) References Cited

OTHER PUBLICATIONS

"Transmission and Multiplexing; High Bit Rate Digital Subscriber Line (HDSL) Transmission System on Metallic Local Lines; HDSL Core Specification and Applications for 2 048 Kbit/S Based Access Digital Sections; ETR 152" European Telecommunications Standard, 3rd Ed., Dec. 1996 RTR/TM-06002.

"Transmission and Multiplexing; High Bit Rate Digital Subscriber Line (HDSL) Transmission System on Metallic Local Lines; HDSL Core Specification and Applications for 2 048 Kbit/S Based Access Digital Sections; ETR 152" European Telecommunications Standard.

IEEE STD 1394B;IEEE Standard for High Performance Serial Bus—Amendment 2(Dec. 2002).

VESA Mobile Digital Interface, Proposed Standard, Version 1P, Draft 15, Nov. 12, 2003, pp. 76-160.

Liptak, "Instrument Engineer's Handbook, Third Edition, vol. Three: Process Software and Digital Networks, Section 4.17, Proprietary Networks, pp. 627-637, Boca Raton" CRC Press, Jun. 26, 2002.

VESA Mobile Display Digital Interface, Proposed Standard: Version 1P, Draft 15, Nov. 12, 2003, pp. 76-160.

Video Electronics Standards Association (VESA) "Mobile Display Digital Interface Standard (MDDI)," Jul. 2004.

VESA Mobile Display Digital Interface, Proposed Standard, Version 1P, Draft 15, Nov. 12, 2003, pp. 76-160.

Plug and Display Standard, Video Electronics Standards Association (VESA) San Jose, CA (Jun. 11, 1997).

Video Electronics Standards Association (VESA), "Mobile Display Digital Interface Standard (MDDI)", Jul. 2004.

Search Report, dated Nov. 8, 2006, for international Application No. PCT/US05/42415, 8 pages.

European Search Report—EP05852048, Search Authority—The Hague Patent Office, Nov. 11-18, 2010.

Hopkins, K. et al.: "Display Power Management," IP.com Journal; IP.com Inc., West Henrietta, NY (Mar. 1, 1995), XP013103130, ISSN: 1533-0001, vol. 38 No. 3 pp. 425-427.

Masnick, B. et al.: "On Linear Unequal Error Protection Codes," IEEE Transactions on Information Theory, vol. IT-3, No. 4, (Oct. 1, 1967), pp. 600-607.

STMicroelectronics: "STV0974 Mobile Imaging DSP Rev.3", Datasheet internet Nov. 30, 2004, XP002619368, Retrieved from the Internet: URL:http://pdf1.alldatasheet.comIdatasheet-pdf/view/112376/Stmicroelectronics/STV0974.html [retrieved on Jan. 27, 2011].

Supplementary European Search Report—EP05849651, Search Authority—The Hague Patent Office, Jan. 31, 2011.

"Universal Serial Bus Specification—Revision 2.0: Chapter 9—USB Device Framework," Universal Serial Bus Specification, Apr. 27, 2000, pp. 239-274, XP002474828.

VESA: VESA Mobile Display Digital Interface Standard: Version 1. Milpitas, CA (Jul. 23, 2004), pp. 87-171.

http://www.3gpp2.org/public_html/specs/C.S0047-0_v1.0_110403.pdf, 3rd Generation Partnership Project 2, Date Apr. 14, 2003, pp. 1-36.

"Nokia 6255", Retrieved from the Internet: URL: http://nokiamuseum.com/view.php model=6255 [8retrieved on Feb. 4, 2012].

Taiwan Search Report—TW094141289—TIPO—Mar. 29, 2012.

European Search Report—EP12157614—Search Authority—The Hague—Aug. 1, 2012.

Taiwan Search Report—TW093133101—TIPO—Feb. 2, 2012.

Taiwan Search Report—TW094141284—TIPO—Aug. 21, 2012.

International search report and Written Opinion—PCT/US05/042413, International Search Authority—European Patent Office—Aug. 25, 2008.

* cited by examiner

METHODS AND SYSTEMS FOR UPDATING A BUFFER

BACKGROUND

1. Field of the Invention

The present invention relates generally to methods and systems for updating a buffer. More particularly, the invention relates to methods and systems for updating a buffer across a communication link.

2. Background of the Invention

In the field of interconnect technologies, demand for ever increasing data rates, especially as related to video presentations, continues to grow, The Mobile Display Digital Interface (MDDI) is a cost-effective, low power consumption, transfer mechanism that enables very-high-speed data transfer over a short-range communication link between & host and a client. MDDI requires a minimum of just four wires plus power for bi-directional data transfer that delivers a maximum bandwidth of up to 3.2 Gbits per second.

In one application, MDDI increases reliability and decreases power consumption in clamshell phones by significantly reducing the number of wires that run across a handset's hinge to interconnect the digital baseband controller with an LCD display and/or a camera. This reduction of wires also allows handset manufacturers to lower development costs by simplifying clamshell or sliding handset designs.

In controlling an LCD display across an MDDI link, one problem that arises relates to image flickering when the display is refreshed. Typically, what is needed is either a long persistence conversion or a refresh rate thai is higher than what the human eye can perceive. Long persistence conversion results in image smearing when images appear to move. Therefore, it is desirable for the display to have a high refresh rate. A typical problem that occurs, however, is image tearing. The problem is that while the display is being refreshed at a high rate, the frame buffer associated with the display is being filled at a slower rate. As a result, the display image may reflect both updated and old image information within the same frame of tire display.

In one solution, multiple buffers are used and image information is cycled through the multiple buffers to avoid the image tearing problem described above. This includes commonly known "double buffering" approaches. The drawback of such solution, however, is clearly in the increased cost and chip space requirements in implementation.

What is needed therefore are methods and systems to enable buffer update solutions that, solve the above described problems while satisfying the cost and space requirements of MDDI applications.

SUMMARY

The present invention relates to methods and systems for updating a buffer.

In one aspect, the present invention provides a method for updating a buffer, which includes strategically writing to the buffer to enable concurrent read and write to the buffer. The method eliminates the need for double buffering, thereby resulting in implementation cost and space savings compared to conventional buffering approaches, Among other advantages, the method prevents image tearing when used to update a frame buffer associated with a display, but is not limited to such applications.

In another aspect, the present invention provides efficient mechanisms to enable buffer update across a communication link. In one example, the present invention provides a method for relaying timing information across a communication link. The method, however, is not limited to relaying timing information, and may be used in more general contexts as can be understood by persona skilled in die art(s) based on the teachings herein.

Further embodiments, features, and advantages of the present invention, as well as the structure and operation of the various embodiments of the present invention, are described in detail below with reference to the accompanying drawings.

BRIEF DESCRIPTION OF THE DRAWINGS

The accompanying drawings, which axe incorporated herein and form a part of the specification, illustrate the present invention and, together with the description, further serve to explain die principles of the invention and to enable a person skilled in the pertinent art to make and use the invention.

DETAILED DESCRIPTION

Figure 1:
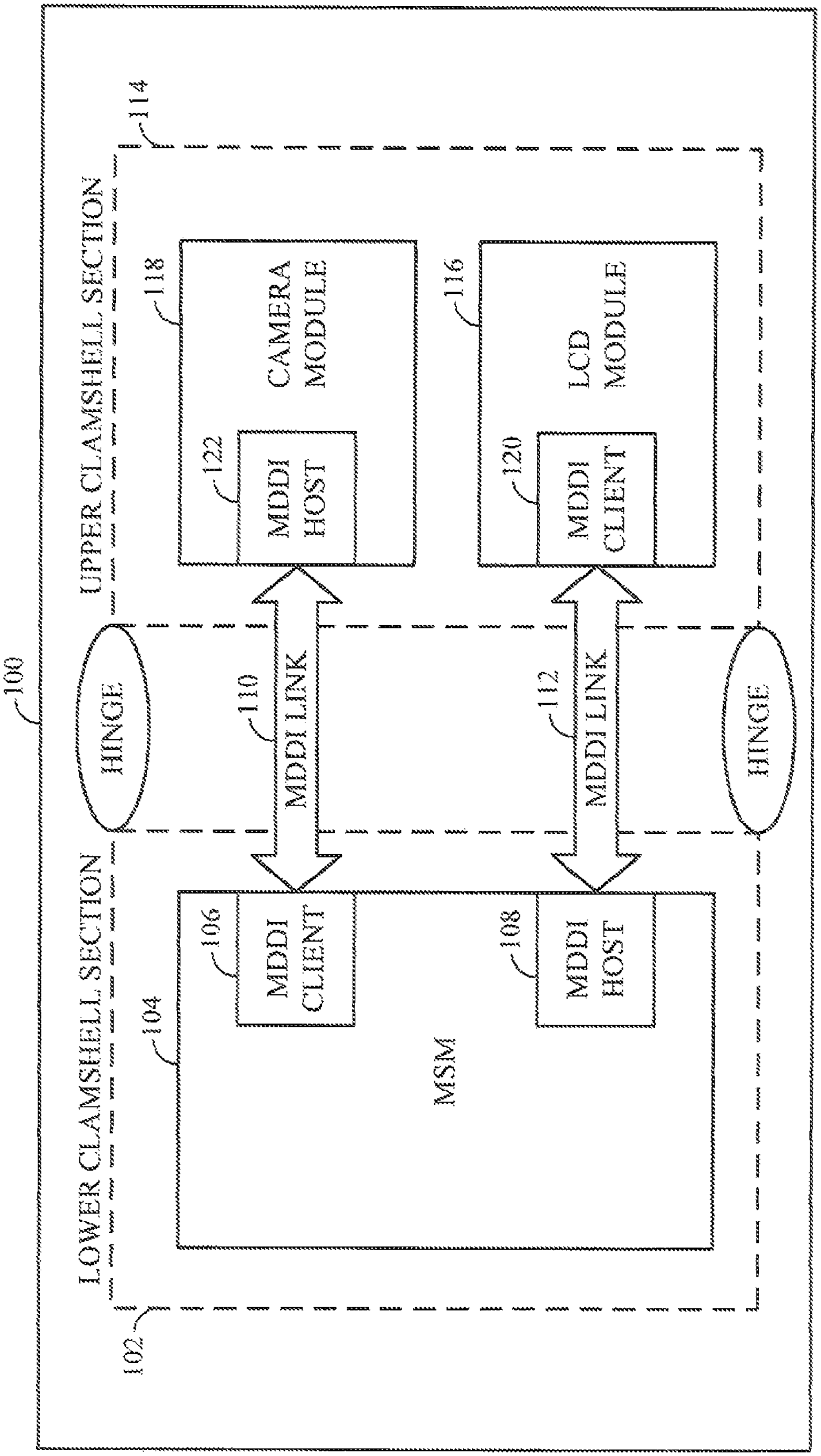
FIG. 1 is a block diagram that illustrates an example environment using a Mobile Display Digital Interlace (MDDI) interface.

This specification discloses one or more embodiments that incorporate the features of this invention. The disclosed embodiment(s) merely exemplify the invention. The scope of the invention is not limited to the disclosed embodiment(s); The invention is defined by the claims appended hereto, The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described, Embodiments of the invention may be implemented in hardware, firmware, software, or any combination thereof Embodiments of fee invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Mobile Display Digital Interface (MDDI)

The Mobile Display Digital interface (MDDI) is a cost-effective, low power consumption, transfer mechanism that enables very-high-speed serial data transfer over a short-range communication link between a host and a client.

In the following, examples of MDDI will be presented with respect to a camera module contained in an upper clamshell of a mobile phone. However, it would be apparent to persons skilled in the relevant art(s) that any module having functionally equivalent features to the camera module could be readily substituted and used in embodiments of this invention.

Further, according to embodiments of the invention, an MDDI host may comprise one of several types of devices that can benefit from using the present invention. For example, the host could be a portable computer in the form of a handheld, laptop, or similar mobile computing device. It could also be a Personal Data Assistant (PDA), a paging device, or one of many wireless telephones or modems. Alternatively, the host could be a portable entertainment or presentation device such as a portable DVD or CD player, or a game playing device. Furthermore, the host can reside as a host device or control element in a variety of other widely used or planned commercial products for which a high speed communication link is desired with a client. For example, a host could be used to transfer data at high rates from a video recording device to a storage based client, for improved response, or to a high resolution larger screen for presentations. An appliance such as a refrigerator that incorporates an onboard inventory or computing system, and/or Bluetooth connections to other household devices, can have improved display capabilities when operating in an internet or Bluetooth connected mode, or have reduced wiring needs for in-the-door displays (a client) and keypads or scanners (client) while the electronic computer or control systems (host) reside elsewhere in the cabinet. In general, those skilled in the an will appreciate the wide variety of modem electronic devices and appliances that may benefit from the use of this interface, as well as the ability to retrofit older devices with higher data rate transport of information utilizing limited numbers of conductors available in either newly added or existing connectors or cables. At the same time, an MDDI client may comprise a variety of devices useful for presenting information to an end user, or presenting information from a user to the host. For example, a micro-display incorporated in goggles or glasses, a projection device built into a hat or helmet, a small screen or even holographic element built into a vehicle, such as in a window or windshield, or various speaker, headphone, or sound systems for presenting high quality sound or music. Other presentation devices include projectors or projection devices used to present information for meetings, or for movies and television images. Another example would be the use of touch pads or sensitive devices, voice recognition input devices, security scanners, and so forth that may be called upon to transfer a significant amount of information from a device or system user with little actual "input" other than touch or sound from tire user. In addition, docking stations for computers and car kits or desk-top kits and holders for wireless telephones may act as interface devices to end users or to other devices and equipment, and employ either clients (output or input devices such as mice) or hosts to assist in the transfer of data, especially where high speed networks are involved. However, those skilled in the art will readily recognize that the present invention is not limited to these devices, there being many other devices on the market, and proposed for use that are intended to provide end users with high quality images and sound, either in terms of storage and transport or in terms of presentation at playback. The present invention is useful in increasing the data throughput between various elements or devices to accommodate the high data rates needed for realizing the desired user experience.

FIG. 1 is a block diagram that illustrates an example environment using an MDDI interface. In the example of FIG. 1, MDDI is used to interconnect modules across the hinge of a clamshell phone 100.

Referring to FIG. 1, a lower clamshell section 102 of clamshell phone 100 includes a Mobile Station Modem (MSM) baseband chip 104. MSM 104 is a digital baseband controller, An upper clamshell section 114 of clamshell phone 100 includes a Liquid Crystal Display (LCD) module 116 and a camera module 118.

Still referring to FIG. 1, an MDDI link 110 connects camera module 118 to MSM 104. Typically, an MDDI link controller is integrated into each of camera module 118 and MSM 104, In the example of FIG. 1, an MDDI Host 122 is integrated into camera module 112, while an MDDI Client 106 resides on the MSM side of the MDDI link 110. Typically, the MDDI host is the master controller of the MDDI link. In the example of FIG. 1, pixel data from camera module 118 are received and formatted into MDDI packets by MDDI Host 122 before being transmitted onto MDDI link 110. MDDI client 106 receives the MDDI packets and re-converts them Into pixel data of the same format as generated by camera module 118. The pixel data, are then sent to an appropriate block in MSM 104 for processing.

Still referring to FIG. 1, an MDDI link 112 connects LCD module 116 to MSM 104. In the example of FIG. 1, MDDI link 112 interconnects an MDDI Host 108, integrated into MSM 104, and an MDDI Client 120 integrated into LCD module 116. In the example of FIG. 1, image data generated by a graphics controller of MSM 104 are received and formatted into MDDI packets by MDDI Host 108 before being transmitted onto MDDI link 112, MDDI client 120 receives the MDDI packets and re-converts them into image data for use by LCD module 116. Typically, image data is buffered using a frame buffer before being used to refresh the LCD display.

Figure 2:
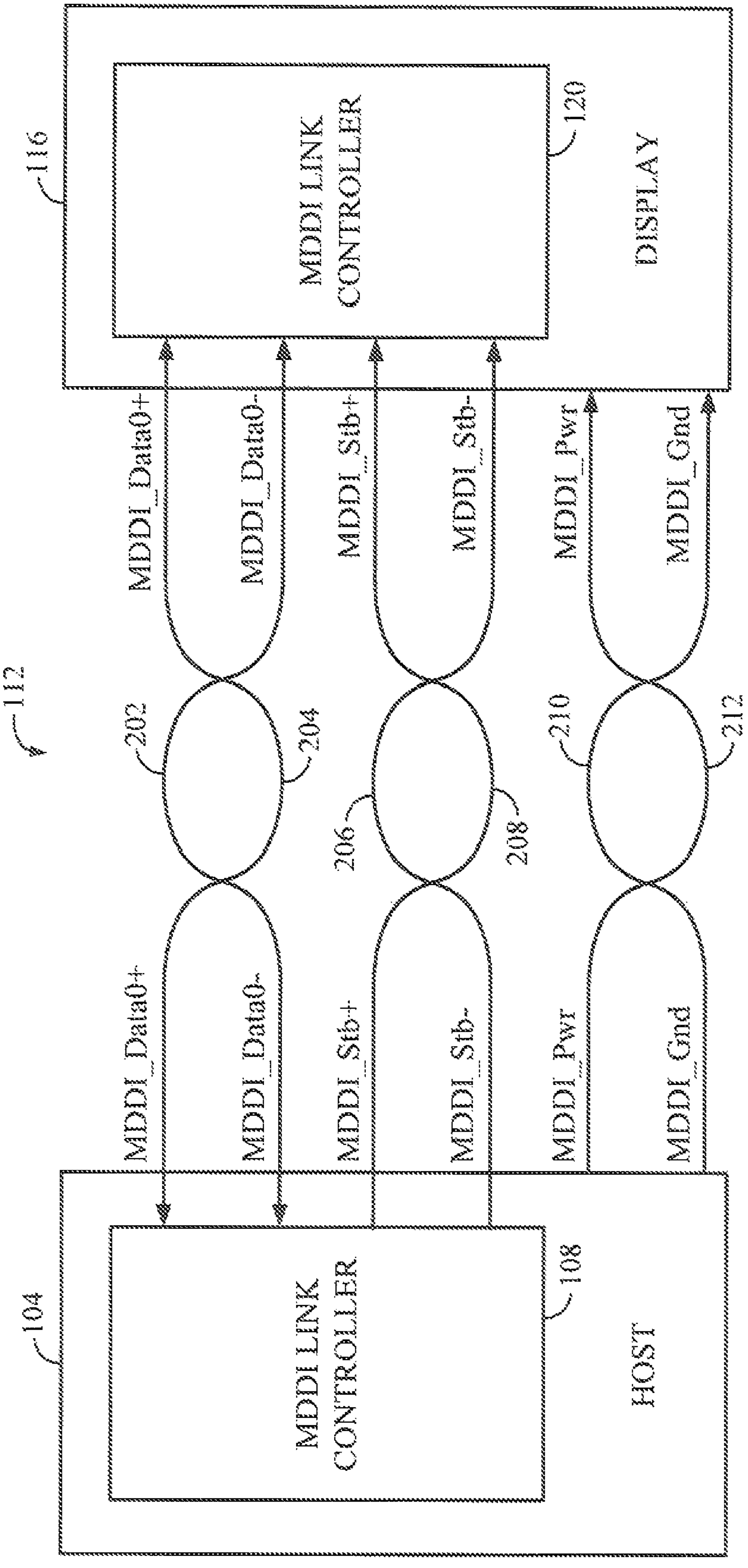
FIG. 2 is a block diagram that illustrates an MDDI link interconnection according to an embodiment of the example of FIG. 1.

FIG. 2 is a block diagram, that illustrates MDDI link interconnection 112 according to the example of FIG. 1, As described above, one of the functions of MDDI link 112 is to transfer image data from MSM 104 to LCD Module 116. A frame interface (not shown in FIG. 2) connects MDDI link controller 120 to modules of LCD Module 116. Similarly, another frame interlace (not shown in FIG. 2) connects MDDI link controller 108 to appropriate modules of MSM 104. Typically, MDDI link controller 108 represents the host controller of the MDDI link, while MDDI link controller 120 represents the client controller of the MDDI. Other implementations, however, may reverse the roles of the two controllers.

MDDI link 112 includes a minimum of four wires, comprising two wires for data signals 202 and 204 and two wires for probe signals 206 and 208, in addition to two wires for power signals 210 and 211. Data signals 202 and 204 are bi-directional Accordingly, data can be transmitted in either direction (from host to client and vice versa) using data signals 202 and 204. Strobe signals 206 and 208 are unidirectional and may only be driven by the host controller of the link. Accordingly, in the example of FIG. 2, only host controller 108 may drive strobe signals 206 and 208.

Method and Systems for Updating a Buffer

As described above, MDDI can be used to connect a baseband processor (MSM 104 in FIG. 2, for example) and a graphics controller (LCD module 116 in FIG. 2, for example). The baseband processor channels image information, typically received from a camera sensor, to the graphics controller, which uses the image information to create a display image. Typically, the graphics controller employs one or more frame buffers to store the image information received from the baseband processor before using it to generate the display image. As described above, image tearing is one problem that occurs. This happens when the image information is being read out of the frame buffer at a rate slower or fester than the rate at which it is being written to the frame buffer. Methods and systems for updating a buffer, which, among other advantages, solve the image tearing problem, will be described herein. It should be noted, however, that methods and systems according to the present invention are not limited to the specific exemplary embodiments in which they will described or to being used in an MDDI environment. Further, methods and systems of the present invention can be employed in various other applications that utilize buffering, and that may benefit from the advantages of the present invention.

Image Tearing

Figure 3:
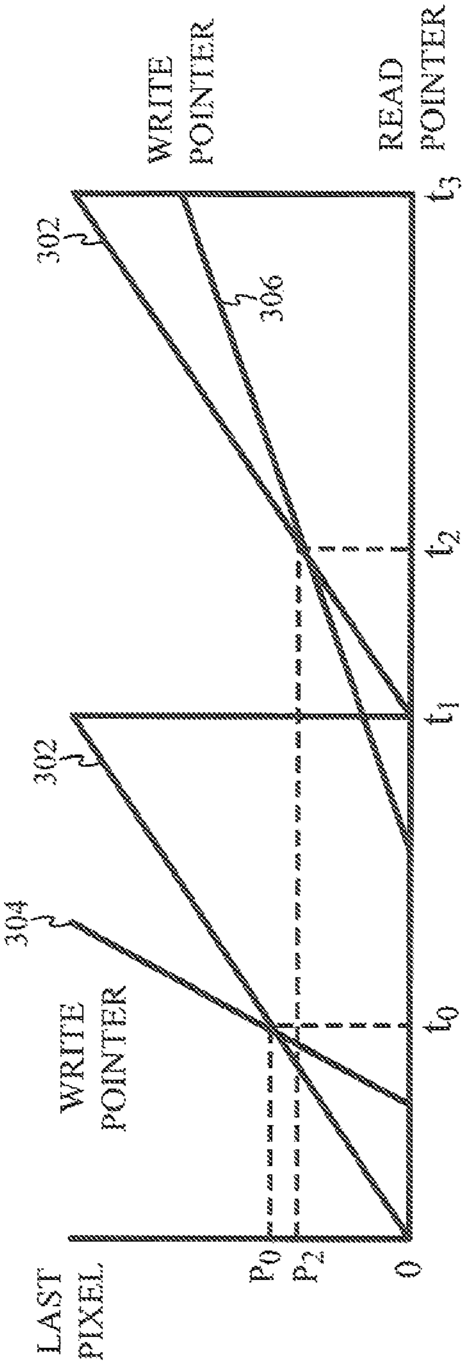
FIG. 3 is an example that illustrates the image tearing problem.

FIG. 3 illustrates two examples of image tearing that can occur while reading from and/or writing to a buffer. The diagram of FIG. 3 shows plots of read and write pointers as functions of buffer position and time. The read pointer represents the position in the buffer that is being read, fire write pointer indicates fee position in the buffer that is being written to. In the example of FIG. 3, the butler position is defined in terms of pixel position in the buffer.

In the first example in FIG. 3, the buffer is being read at a slower rate than it is written to. This is illustrated by the relative slopes of read and write pointer lines 302 and 304, Note that read and write pointer lines 302 and 304 intersect at time $t_0$. Before time $t_0$, pixels in the buffer are being read prior to being updated. After time $t_0$, pixels are being updated prior to he read. Accordingly, within the same frame (from time 0 to time $t_1$), pixels in positions 0 to $p_0$ (which corresponds to the pixel position read at time $t_0$) are read with older image information relative to pixels from position $p_0$ to the last pixel in the buffer, which are read with updated image information. The result is image tearing with a lower portion of the image reflecting newer image information relative to an upper portion of the image.

In the second example in FIG. 3, the buffer is being read at a taster sate than it is written to. This is illustrated by the relative slopes of read and write pointer lines 302 and 306. Read and write pointer lines 302 and 306 intersect at time $t_2$. Before time $t_2$, pixels in the buffer are being updated prior to being read. After time $t_2$, pixels are being read prior to being updated. Accordingly, within the same frame (from time $t_1$ to time $t_3$), pixels in positions 0 to $p_2$ (which corresponds to the pixel position read at time $t_2$) are read with newer image information relative to pixels from position, $p_2$ to the last pixel in the buffer, which are read with old image information. The result is image tearing with an upper portion of the image reflecting newer image information relative to a lower portion of the image.

Method for Updating a Suffer

A method to strategically update a buffer will now be provided. The method prevents image tearing when used to update a frame buffer associated with a display. The method may also be used in other buffering applications based on its apparent advantages as will be described herein.

Figure 4:
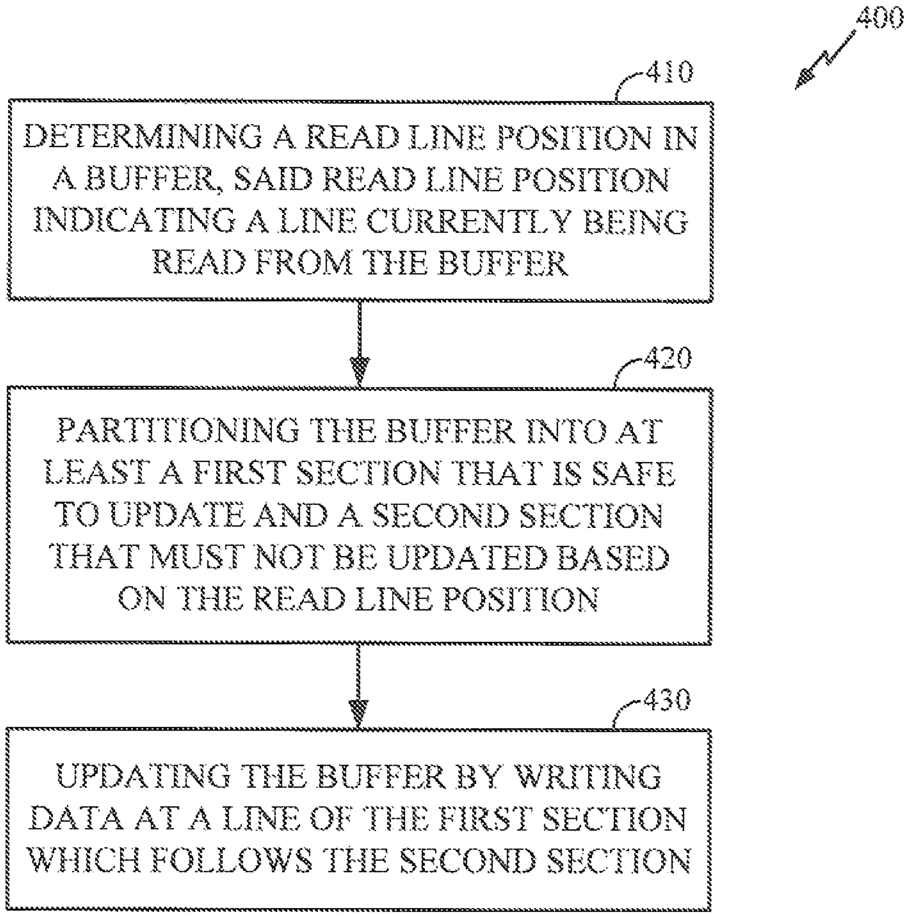
FIG. 4 is a process flowchart that illustrates a method for updating a buffer according to the present invention.

FIG. 4 is a process flowchart 400 that illustrates a method for updating a buffer according to the present invention. Process flowchart 400 begins in step 410, which includes determining a read line position in the buffer. The read line position indicates a line currently being read from the buffer. Typically, step 410 is achieved by determining the value of a read pointer that points to the read line position in the buffer.

Step 420 includes partitioning the buffer into at least a first section that is safe to update and a second section that must not be updated based on the read line position. It is noted here that partitioning the buffer does not refer here to a physical but to a logical partitioning of the buffer. Further, a logical partition of the buffer is not feed and may change as will be understood from the teachings herein. The first section of the buffer includes lines of the buffer that have been, read within the current buffer reading cycle based on the read line position. The first section also includes lines of the buffer that can be updated based on the read line position. In other words, the first section includes lines whose content has just been read or lines that can be updated prior to the read line position reaching them based on the buffer read speed and the buffer write speed. Lines that cannot be updated prior to the read line position reaching them based on the buffer read speed and die buffer write speed belong to the second section of the buffer. In other words, lines of the second section of the buffer are those for which there is not sufficient time to update before they have to be read. Accordingly, lines of the second section of the buffer must have been updated during the last reading cycle of the buffer.

Step 430 includes updating the buffer by writing data at a line of the first section which follows the second section based on the read line position. Typically, the buffer is updated at a position which is both safe to update as described above and which has already been read during the last reading cycle of the buffer. In one embodiment, step 430 includes writing data at a line of the first section which immediately follows the last line of the second section. Other variations of step 430 may also be possible as will be apparent to a person skilled in the art based on the teachings disclosed herein.

EXAMPLE ILLUSTRATION

Figure 5:
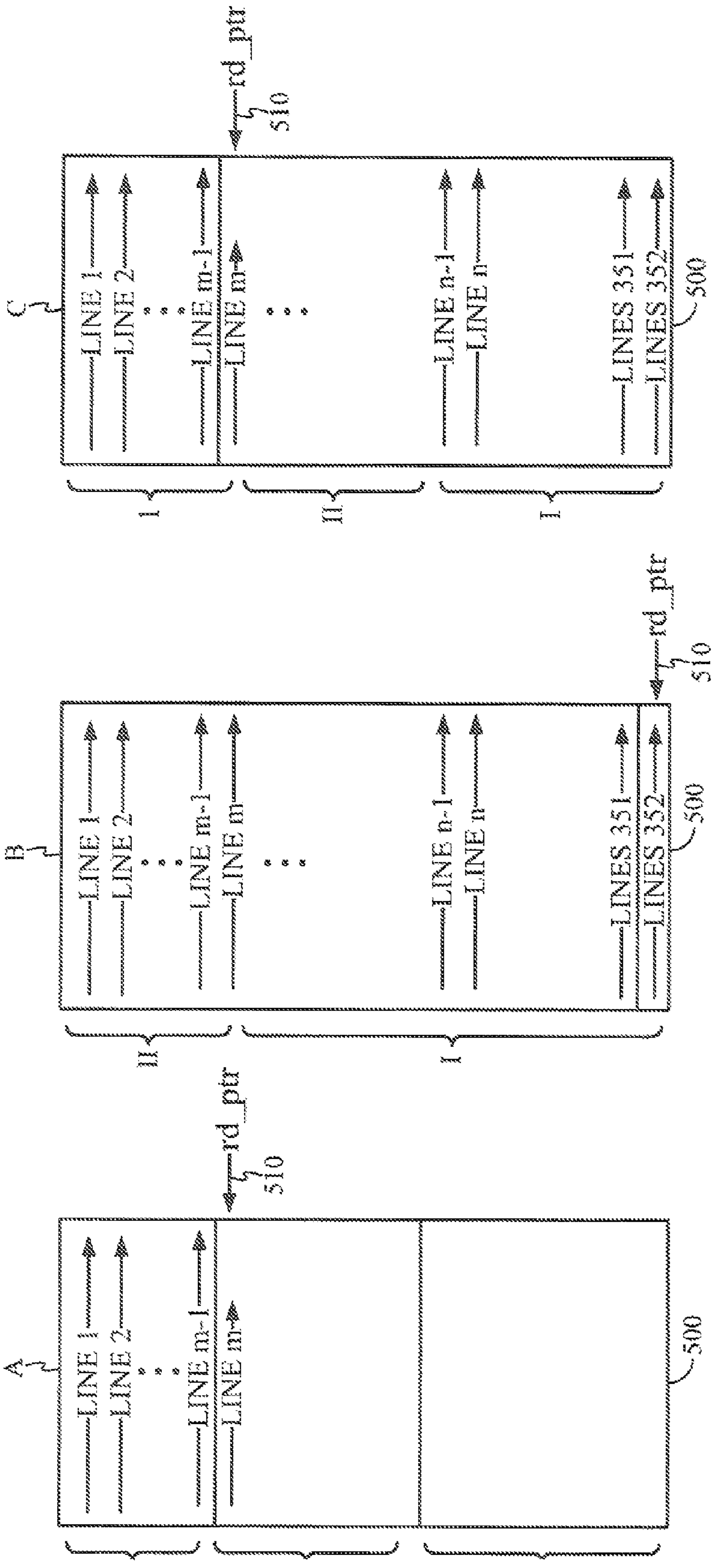
FIG. 5 illustrates examples of the method of FIG. 4.

FIG. 5 provides examples that illustrate the method described above in FIG. 4. FIG. 5 shows three examples A, B, and C of reading a butler 500. For purposes of illustration only, buffer 500 is shown to include 352 lines of data. A read pointer 510 indicates the read line position in the buffer. Sections labeled with the roman numeral "I" represent lines that belong to the first section of the buffer as described above. Sections labeled with the roman numeral "II" represent lines that belong to the second section of the buffer as described above.

In example A, shaded area "I" represents lines of the first section of the buffer which have already been read during the current reading cycle of the buffer. In the example, this area includes lines 1 through m-1. Read pointer S10 indicates that line m is currently being read. Accordingly, area "II" In example A represents lines of buffer 500 that cannot be updated based on the current position of read pointer 510. In other words, there is no sufficient time to update lines in area "II" based on the current position of read pointer 510 and the read and write speeds to the buffer. Note that the first section of the buffer also includes an unshaded area "I" below area "II". This area "I" belongs to the first section as it is safe to update, but should not be updated given that it has not been read during the current reading cycle of the buffer. Updating unshaded area "I" prior to reading it would result in image tearing, as described in FIG. 3, where the upper portion of the image reflects older image information relative to the lower portion of the image.

In example B, the shaded area, represents lines of the buffer which have already been read during the current reading cycle of the buffer. In the example, this area includes lines 1 through 351. Read pointer 510 indicates that line 352 is currently being read. Accordingly, area "II" in example B represents lines that must have been updated given the current read line position. Lines in area "II" cannot be updated based on the current read line position and the read and write speeds to the buffer, and belong to the second section of the buffer based on the description above. Lines in area "I" belong to the first section of the buffer, and are safe to update. To update the buffer, writing can begin in area "I". Data, can be written at a line in area "I" that immediately follows area "II". This corresponds to line m in example B.

Example C illustrates a scenario subsequent to the one shown in B. In example C, read pointer 510 has wrapped around and is reading line m of the buffer. Accordingly, lines preceding the read pointer in the buffer belong to the first section of the buffer, and may be updated. Lines in ares "II" must have been updated during the last write cycle to the buffer gives the current read line position. Lines in area "II" cannot be updated, and belong to the second section of the buffer as described above. In other words, lines in area "II" must contain updated information given the read line position, as there is not sufficient time to update them before they have to be read. Shaded area "I" represents lines of the first section of the buffer that are safe to update, but should not be updated given that they have not been read during the last reading cycle of the buffer.

Buffer Read/Write Strategies

Buffer read/write strategies to avoid image tearing or equivalent problems related to buffer update are described herein. Buffer update strategies according to the present invention further eliminate the need for the commonly adopted "double buffering" technique. Instead, a single buffer is used, which results in both implementation cost and space savings. The present invention is not limited to the exemplary strategies described herein, and variations which, are apparent to persons skilled in the art(s) are also considered to be within the scope of the present invention.

FIGS., 6A and 6B illustrate exemplary buffer read/write strategies according to the present invention. The diagrams of FIGS. 6A and 6B show plots of read pointer 612 and write pointers 614 and 616 as functions of buffer position and time $t_1$, in the examples of FIGS. 6A and 6B, die buffer position is defined in terms of pixel position in the buffer, which may he equivalently replaced with any other measure of buffer position, such as line number, for example.

Figure 6A:
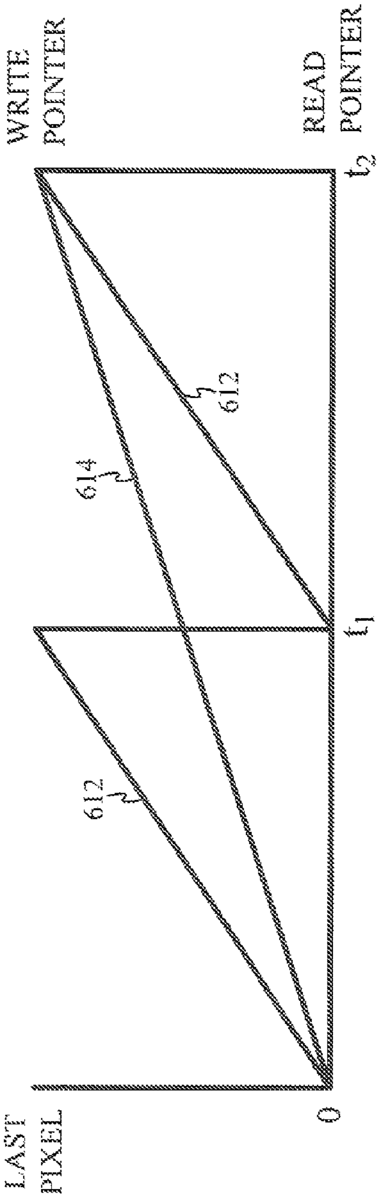
FIGS. 6A, 6B illustrate buffer read/write strategies.

Referring to FIG. 6A, an exemplary buffer read/write strategy is depicted over two reading cycles of the buffer. In the first reading cycle, from time 0 to time $t_1$, the first half of the buffer is updated, while the entire buffer content is read. In the second reading cycle of the buffer, from time $t_1$ to time $t_2$, the second half of fee buffer is updated, while the entire buffer content is read. Note that the first half of the buffer, during the second reading cycle, contains updated information that were written to the buffer during the first reading cycle. The second half of the buffer, during the second cycle, is updated prior to being read as shown by write pointer 614 preceding read pointer 612 in time over the second reading cycle. Accordingly, over both reading cycles, data read from fee buffer belongs to fee same update cycle of the buffer, and no image tearing occurs.

Figure 6B:
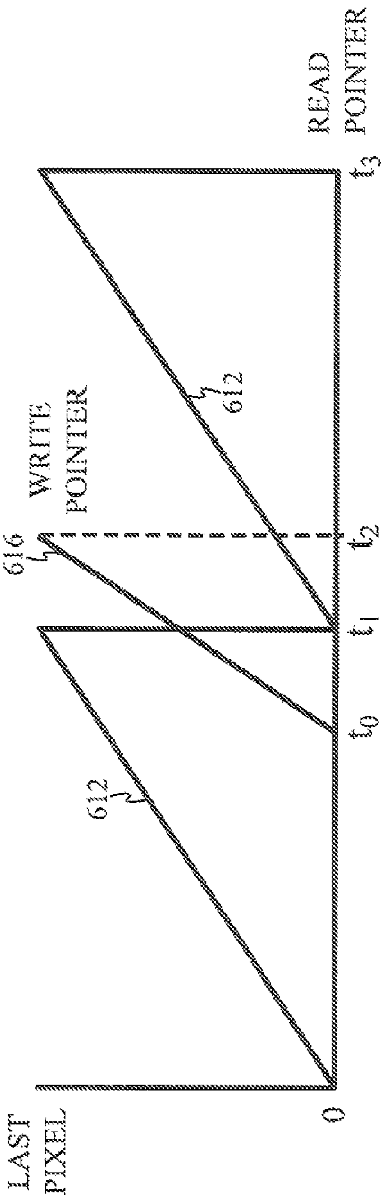

FIG. 6B illustrates another exemplary buffer read/write strategy over two reading cycles of fee buffer. During the first reading cycle, the first half of the buffer is updated from time $t_0$ to time $t_1$. During the second reading cycle, the second half of the buffer is updated from time $t_1$ to time $t_2$. Note that writing to the buffer starts at a time to during the first cycle such that, during the first cycle, the entire buffer is read with an initial information content and not an updated content due to the writing, process. On the other hand, writing to the buffer ends at a time $t_2$ during the second cycle such that, daring fee second cycle, the entire buffer contains updated information content when it is read. This is shown by write pointer 616 preceding read pointer 612 in time over fee second reading cycle. Accordingly, image tearing will not occur over both reading cycles in the example of FIG. 6B.

Buffer Update Through a Communication Link

Methods and systems for updating a buffer according to the present invention may be used in a variety of applications, in one application, as described above, the buffer update approach may be used to update a frame buffer associated with a display. In another application, the buffer is updated remotely, wherein it is written to by a first processor and is read by a second processor, and wherein the first and second processors communicate through a communication link. For example, the first and second processors represent an MSM baseband processor and an LCD module, respectively, that communicate through an MDDI link, as illustrated in FIG. 2. In certain applications, synchronization between the first and second processors will be required.

Methods and systems related to synchronization to enable buffer update across a communication link will now be provided. As will be understood by a person skilled in the art(s) based, on the teachings herein, certain aspects of the methods and systems that will be presented may be applicable to synchronization problems in general, and are not limited to synchronization for enabling remote buffer update.

In one aspect, synchronization between the first and second processors includes scheduling, a first event at the first processor that is triggered by a second event at the second, processor. This is typically done by writing to a register to enable the triggering of an interrupt that causes the first event at the first processor whenever the second event occurs at the second processor. For example, in a remote buffer update application, where the buffer is updated by the first processor and read by the second processor, the first event may represent the need to start writing to the buffer, while the second event may represent that the read pointer has finished a complete reading cycle of the buffer. The second event may then be triggered at the second processor based on the read line position in die buffet.

Figure 7:
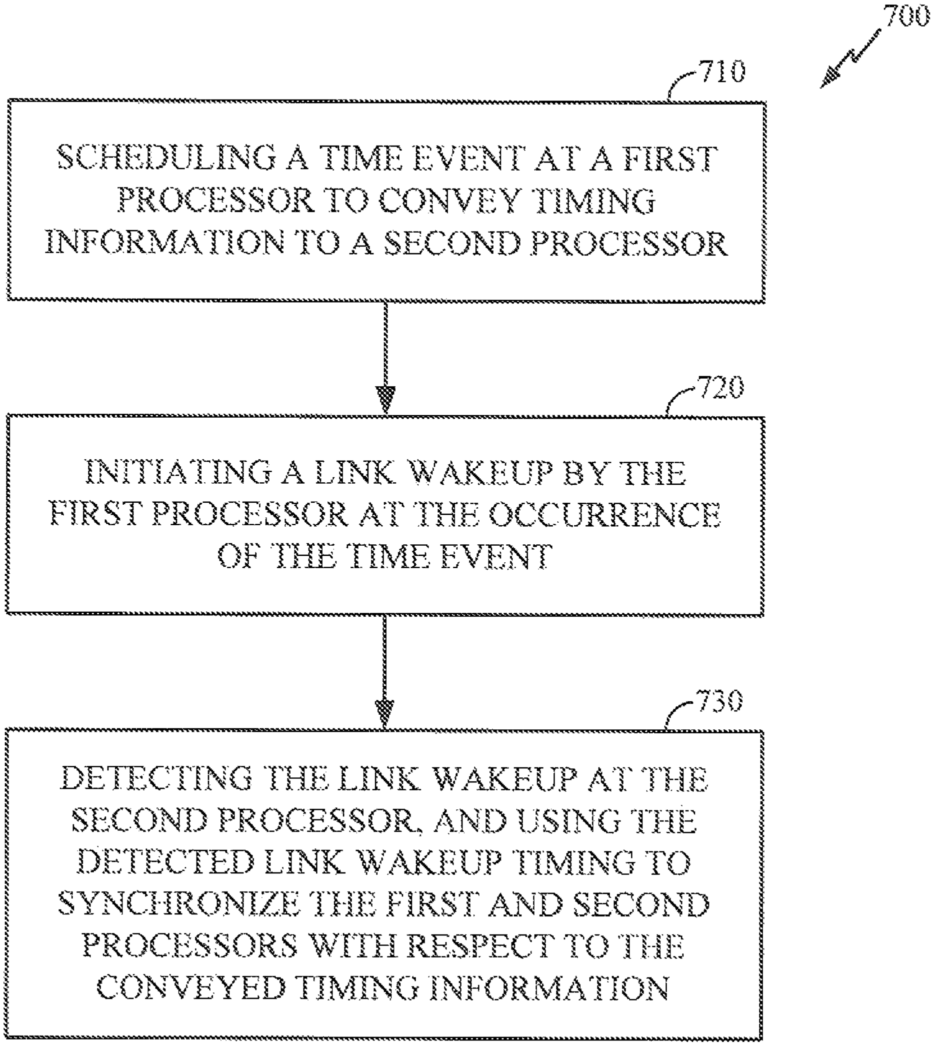
FIG. 7 is a process flowchart that illustrates a method for conveying timing information across a communication link according to the present invention.

In another aspect, methods to convey synchronization information across the communication link are provided. The methods may be employed to relay synchronization information related to buffer update, as described above, for example. FIG. 7 is a process flowchart 700 feat illustrates a method for conveying timing information across a communication link between a first processor and a second processor, when the communication link is in hibernation mode. Process flow-chart 700 begins in step 710, which includes scheduling a time event at the first processor to convey timing information to the second processor. The time event may be a periodic event as required by the specific application. For example, in the case of a buffer update application, the time event may be related to the read line position in the buffer.

Step 720 includes, initiating a link wakeup by the first processor at the occurrence of the time event. For example, in the case of a buffer update across an MDDI link, where an MDDI client is located at the LCD module side of the interconnection, the MDDI client may initiate a link wakeup by driving the data signal to a logic one to notify the MDDI host that the buffer should be updated.

Subsequently, step 730 includes detecting the link wakeup at the second processor (for example, an MDDI host on the MSM side of the MDDI interconnection), and using the detected link wakeup timing to synchronize the first and second processors with respect to the timing information that is being conveyed. For example, in the case of a buffer update across an MDDI link, when the MDDI host detects the link wakeup by the MDDI client, it can synchronize itself with the MDDI client with respect to the buffer update start time.

It can be appreciated by a person skilled in fee art based on fee teachings herein that the method described in FIG. 7 may be extended to convey any kind of timing information across a communication link, and is not limited to buffer update synchronization purposes. The advantages of such method are through saving the link and conveying information by simply waking fee link up.

Figure 8:
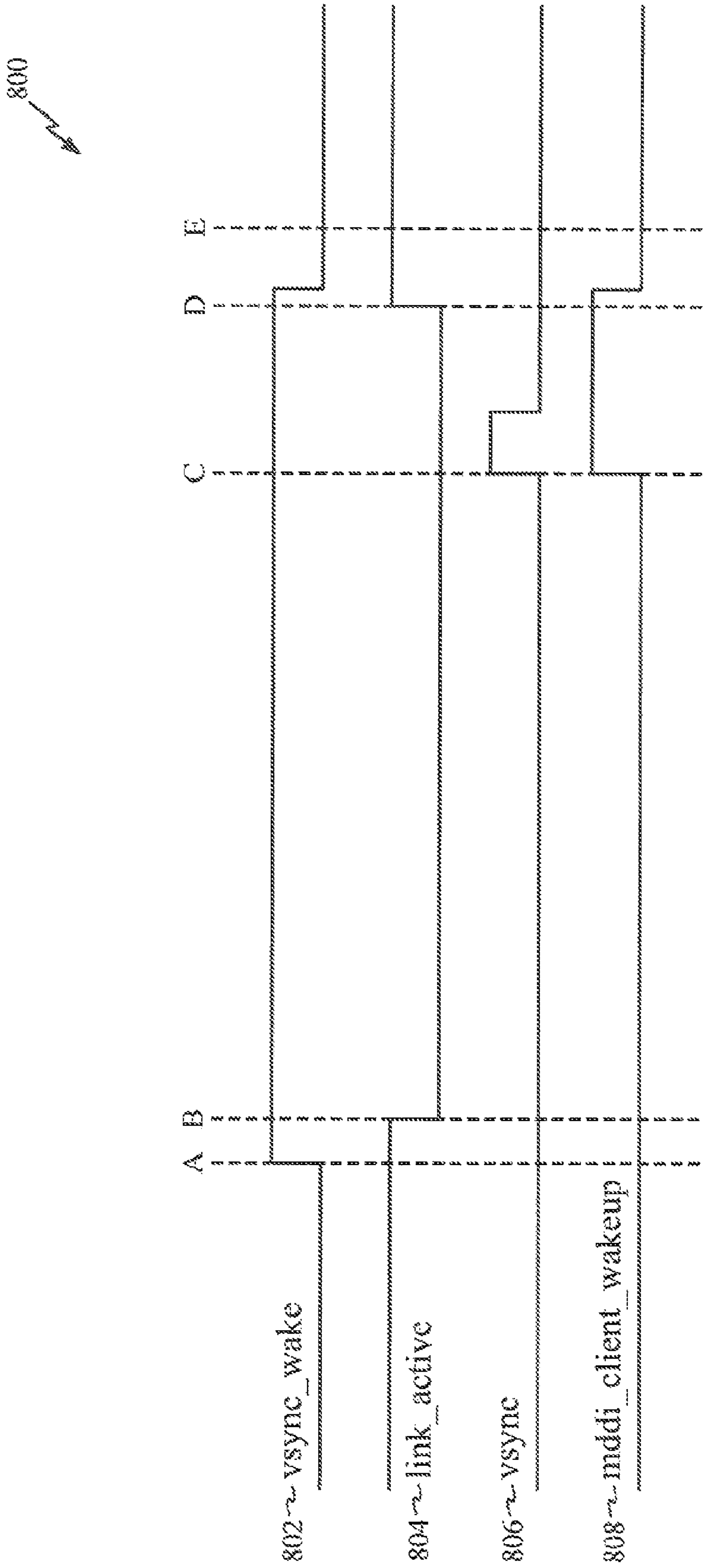
FIG. 8 illustrates an example signal timing diagram for initiating MDDI link wakeup to convey timing information, The present invention will be described with reference to the accompanying drawings. The drawing in which an element first appears is typically indicated by the leftmost digit(s) in the corresponding reference number.

FIG. 8 illustrates an example timing diagram 800 for initiating link wakeup to convey timing information across an MDDI interconnection. For example, the MDDI interconnection may be such as the one described above with reference to FIG. 2 with an MDDI host located at the MSM and an MDDI client located at the LCD module. The MDDI client, accordingly, would initiate a link wakeup to convey buffer update information to fee MDDI host, which, in turn, would start refreshing the buffer located in the LCD module. In fee example of FIG. 8, vsync_wake signal 802 represents a value written to a register at the MDDI host to enable a wakeup at the host based on vsync signal 806, Wakeup at fee host occurs whenever the value of vsync_wake 802 is high. Vsync signal 806 represents a value of a signal "vertical sync", which occurs at the client and is related to buffer update time, for example, vsync 806 goes high whenever the read pointer has wrapped and is reading from the beginning of the buffer. Link_active signal 804 represents whether or not the data signal of the MDDI interconnection is active or in hibernation. Mddi_client_wakeup signal 808 represents a signal at the client, which responds to vsync 806 to wake up fee client.

In the example of FIG. 8, vsync_wake 802 is set at the host at time A. At time B, the MDDI link goes into hibernation, mode. At time C, vsync 806 goes high indicating feat fee buffer needs to be refreshed by the host. As a result, mddi_client_wakeup 808 also goes high to wake die client up to initiate the link wakeup. The client initiates the link wakeup by driving the data signal of the interconnection, and the link goes active at time D. Subsequently, vsync_wake 802 and mddi_client-_wakeup return to zero, and fee host detects the link wakeup and begins to refresh the buffer at the client.

CONCLUSION

While various embodiments of the present invention have been, described above, it should be understood, that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for updating a buffer having a plurality of lines associated with a display to prevent image tearing, comprising:

(a) determining a read line position in the buffer, the read line position indicating a line currently being read from the buffer, wherein the buffer is written to by a first processor and is read by a second processor;

(b) partitioning the buffer into at least a first section that is safe to update and a second section that must not be updated based on the read line position; and (c) writing data at a line of the first section to update the buffer, wherein the line follows the second section based on the read line position.

2. The method of claim 1, further comprising the step of the first and second processors communicating remotely through a communication link.

3. The method of claim 1, wherein the first processor updates the buffer based on a first event at the first processor that is triggered by a second event at the second processor.

4. The method of claim 3, further comprising:

(d) scheduling the first event by writing to a register to enable the triggering of an interrupt that causes the first event based on the second event; and (e) triggering the second event at the second processor based on the read line position of the buffer.

5. The method of claim 3, wherein the first event comprises a link wakeup event when the communication link is in hibernation mode.

6. The method of claim 1, wherein the first and second processors comprise host and client controllers of a Mobile Display Digital Interface (MDDI) link.

7. The method of claim 6, wherein a first controller comprises a Mobile Station Modem (MSM) baseband processor, and wherein a second controller comprises a display controller.

8. The method of claim 1, wherein the buffer comprises a frame buffer used for refreshing a display.

9. A system for updating a buffer having a plurality of lines associated with a display to prevent image tearing, comprising:

means for determining a read line position in the buffer, the read line position indicating a line currently being read from the buffer, wherein the buffer is written to by a first processor and is read by a second processor;

means for partitioning the buffer into at least a first section that is safe to update and a second section that must not be updated based on the read line position; and means for writing data at a line of the first section to update the buffer, wherein the line follows the second section based on the read line position.

10. The system of claim 9, wherein the first and second processors communicate remotely through a communication link.

11. The system of claim 9, wherein the first processor updates the buffer based on a first event at the first processor that is triggered by a second event at the second processor.

12. The system of claim 11, further comprising:

means for scheduling the first event by writing to a register to enable the triggering of an interrupt that causes the first event based on the second event; and means for triggering the second event at the second processor based on the read line position of the buffer.

13. The system of claim 11, wherein the first event comprises a link wakeup event when the communication link is in hibernation mode.

14. The system of claim 9, wherein the first and second processors comprise host and client controllers of a Mobile Display Digital Interface (MDDI) link.

15. The system of claim 14, wherein the host controller comprises a Mobile Station Modem (MSM) baseband processor, and wherein the client controller comprises a display controller.

16. The system of claim 9, wherein the buffer comprises a frame buffer used for refreshing a display.

* * * * *